(12) United States Patent
Gupta et al.

(10) Patent No.: US 11,520,355 B2
(45) Date of Patent: Dec. 6, 2022

(54) WING TIP CONTROL EFFECTOR

(71) Applicant: Toyota Motor Engineering & Manufacturing North America, Inc., Plano, TX (US)

(72) Inventors: Rikin Gupta, Ann Arbor, MI (US); Taewoo Nam, Ann Arbor, MI (US); Yufei Zhu, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/186,251

(22) Filed: Feb. 26, 2021

(65) Prior Publication Data

US 2022/0276661 A1 Sep. 1, 2022

(51) Int. Cl.
*G05D 1/08* (2006.01)
*B64C 23/06* (2006.01)
(Continued)

(52) U.S. Cl.
CPC ........... *G05D 1/0825* (2013.01); *B64C 13/04* (2013.01); *B64C 13/38* (2013.01); *B64C 23/076* (2017.05);
(Continued)

(58) Field of Classification Search
CPC ...... G05D 1/0825; B64C 13/04; B64C 13/38; B64C 23/076; B64C 31/06; B64C 2031/065
See application file for complete search history.

(56) References Cited

U.S. PATENT DOCUMENTS 1,841,921 A * 1/1932 Spiegel ................. B64C 23/069
244/199.4
2,565,990 A 8/1951 Richard
(Continued)

FOREIGN PATENT DOCUMENTS

CN 105946515 A 9/2016
EP 0772544 B1 2/2005
(Continued)

OTHER PUBLICATIONS

Muller et al., "Design of Bio-Inspired Autonomous Airccraft for Bird Management", 16th Australian Aerospace Congress, Feb. 23-24, 2015 (8 pages).
(Continued)

*Primary Examiner* — Valentina Xavier
(74) *Attorney, Agent, or Firm* — Christopher G. Darrow; Darrow Mustafa PC

(57) ABSTRACT

An aircraft can include a first wing and a second wing. The first wing can extend laterally from an aircraft body to a first tip, and the second wing can extend laterally from the aircraft body to a second tip. The aircraft can include a first end effector and a second end effector, each including a fore winglet and an aft winglet. The fore and aft winglets of the first end effector can be pivotably connected to the first tip. The fore and aft winglets of the second end effector can be pivotably connected to the second tip. The fore and aft winglets of the first and second end effectors can be independently operable. The first and second end effectors can be independently operable. A processor can be operatively connected to control movement of the fore and aft winglets of the first and second end effectors.

21 Claims, 6 Drawing Sheets

(51) Int. Cl.
  *B64C 13/04*      (2006.01)
  *B64C 13/38*      (2006.01)
  *B64C 31/06*      (2020.01)
(52) U.S. Cl.
  CPC ........ *B64C 31/06* (2013.01); *B64C 2031/065* (2013.01)

(56) References Cited

U.S. PATENT DOCUMENTS

| | | | |
|---|---|---|---|
| 4,671,473 A * | 6/1987 | Goodson | B64C 23/076 244/46 |
| 4,722,499 A * | 2/1988 | Klug | B64C 23/076 244/45 R |
| 5,072,894 A | 12/1991 | Cichy | |
| 5,686,003 A | 11/1997 | Ingram et al. | |
| 6,345,790 B1 * | 2/2002 | Brix | B64C 23/076 244/46 |
| 6,578,798 B1 * | 6/2003 | Dizdarevic | B64C 23/069 244/35 R |
| 7,306,187 B2 | 12/2007 | Lavan | |
| 7,503,527 B1 | 3/2009 | Fairchild | |
| 7,744,038 B2 | 6/2010 | Sankrithi et al. | |
| 7,878,459 B2 | 2/2011 | Mabe et al. | |
| 7,900,876 B2 * | 3/2011 | Eberhardt | B64C 23/069 244/199.4 |
| 8,322,650 B2 | 12/2012 | Kelleher | |
| 8,439,313 B2 | 5/2013 | Rawdon et al. | |
| 8,757,555 B2 | 6/2014 | Werthmann et al. | |
| 9,555,895 B2 | 1/2017 | Vander Lind et al. | |
| 9,981,421 B2 | 5/2018 | Marcoe et al. | |
| 10,191,550 B1 | 1/2019 | Nussbaum et al. | |
| 10,336,412 B2 | 7/2019 | Morris | |
| 10,343,763 B2 * | 7/2019 | Cross | F04D 29/38 |
| 10,625,847 B2 * | 4/2020 | Dhandhania | B64C 23/069 |
| 10,773,487 B2 | 9/2020 | Frigerio et al. | |
| 10,933,974 B2 | 3/2021 | Tsuruta et al. | |
| 10,981,643 B2 * | 4/2021 | Cross | B64C 23/072 |
| 11,254,412 B2 * | 2/2022 | Dees | B64C 3/56 |
| 11,279,469 B2 * | 3/2022 | Petscher | B64C 23/069 |
| 2003/0150957 A1 | 8/2003 | Thomas | |
| 2006/0027703 A1 * | 2/2006 | Bussom | B64C 23/072 244/17.13 |
| 2006/0049307 A1 * | 3/2006 | Schweiger | B64C 27/615 244/75.1 |
| 2009/0283643 A1 | 11/2009 | Sar et al. | |
| 2010/0135806 A1 * | 6/2010 | Benito | F03D 7/0228 290/55 |
| 2011/0300358 A1 | 12/2011 | Blohowiak et al. | |
| 2012/0292155 A1 | 11/2012 | Gunter | |
| 2016/0345088 A1 | 11/2016 | Vilermo et al. | |
| 2018/0249772 A1 | 9/2018 | Koo et al. | |

FOREIGN PATENT DOCUMENTS

| | | |
|---|---|---|
| EP | 1420094 B1 | 5/2005 |
| EP | 3206949 B1 | 8/2018 |
| JP | 2020103843 A | 7/2020 |
| WO | 2015150470 A1 | 10/2015 |
| WO | 2019186208 A1 | 10/2019 |

OTHER PUBLICATIONS

Di Luca et al., "Bioinspired morphing wings for extended flight envelope and roll control of small drones", The Royal Society Publishing, 2016 (11 pages).
Bourdin et al., "Aircraft Control via Variable Cant-Angle Winglets", Journal of Aircraft, vol. 45, No. 2, Mar.-Apr. 2008, pp. 414-423 (10 pages).
Ameri et al., "Modelling the Dynamic Response of a Morphing Wing with Active Winglets", AIAA Atmospheric Flight Mechanics Conference and Exhibit, Aug. 20-23, 2007 (19 pages).
Buckner, et al., "Roboticizing fabric by integrating functional fibers", Proceedings of the National Academy of Sciences (PNAS), vol. 117, No. 41, pp. 25360-25369, Oct. 13, 2020 (10 pages).
Buckner, et al., "Roboticizing fabric by integrating functional fibers", <http://movie-usa.glencoesoftware.com/video/10.1073/pnas.2006211117/video-4>.
U.S. Appl. No. 17/326,885, filed May 21, 2021.
Blain, "Refrigerants not required: Flexible metal cooling prototype demonstrates extreme efficiency", New Atlas, Mar. 13, 2019 <https://newatlas.com/shape-memory-alloy-nitinol-heating-cooling/58837/> (13 pages).
U.S. Appl. No. 17/721,793, filed Apr. 15, 2022.
U.S. Appl. No. 17/721,931, filed Apr. 15, 2022.

* cited by examiner

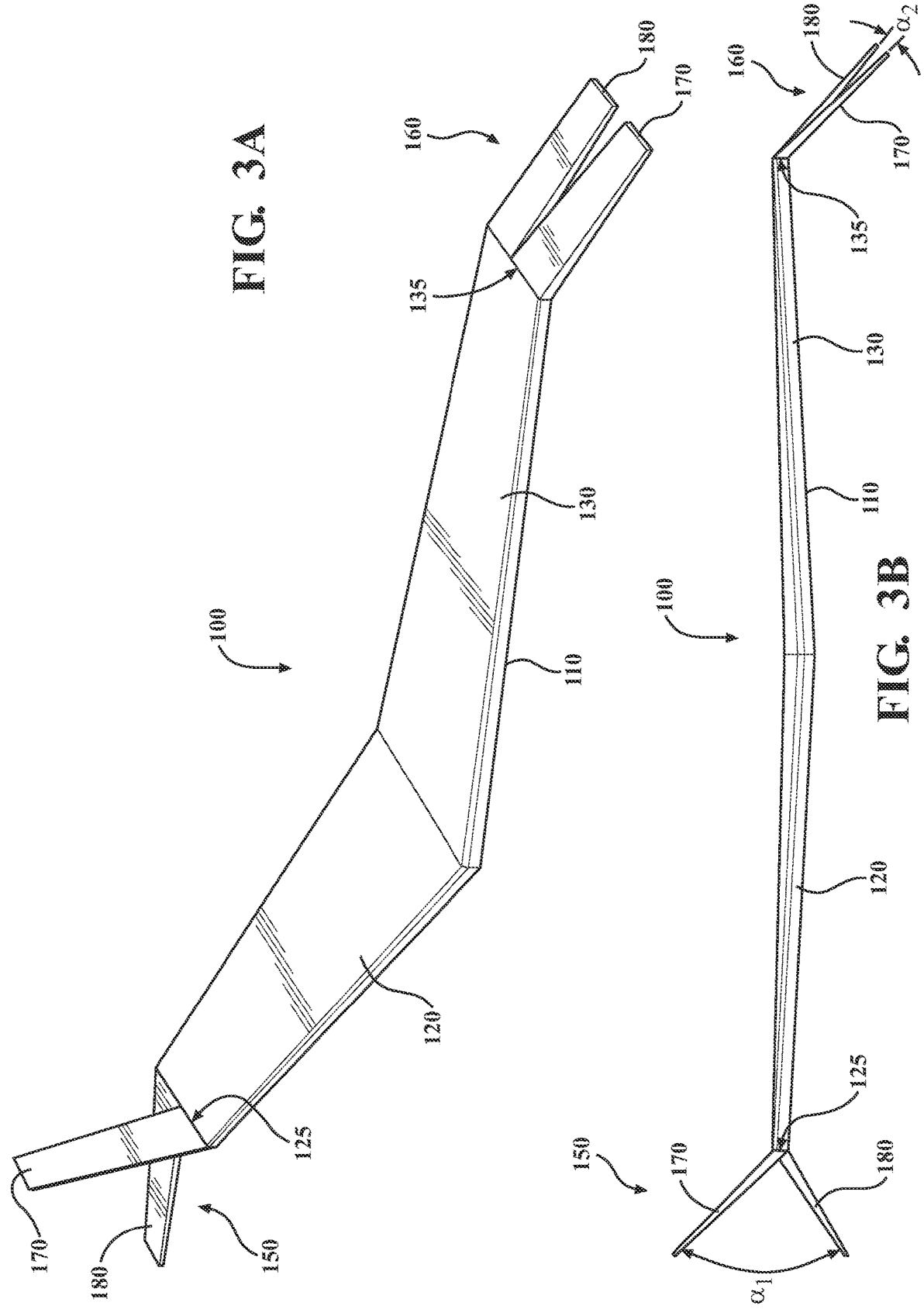

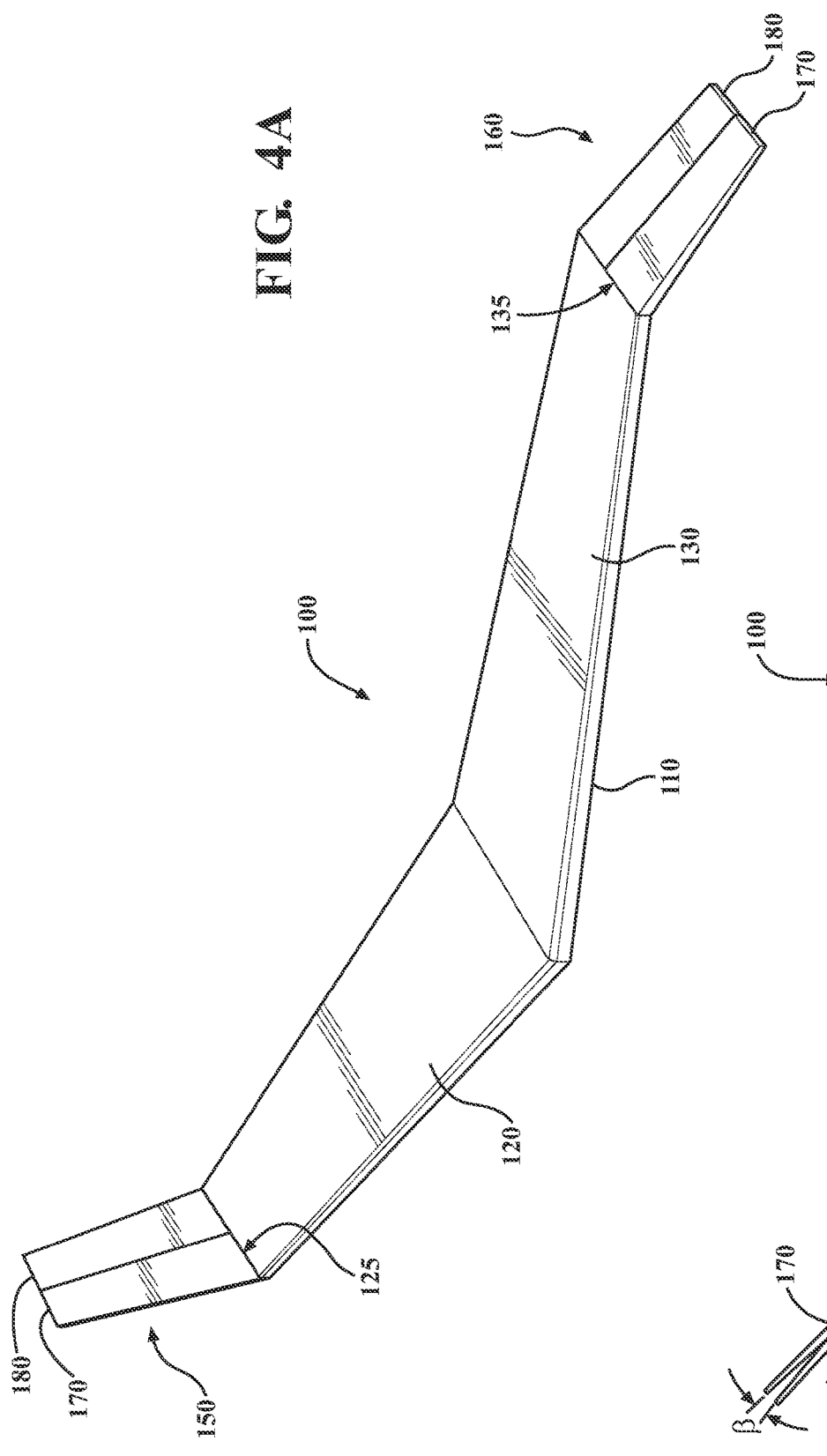
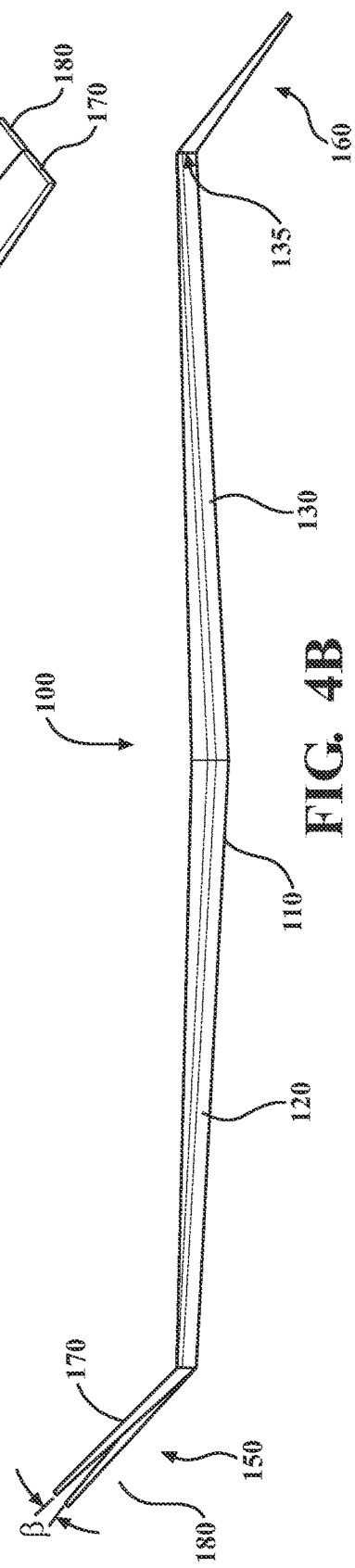

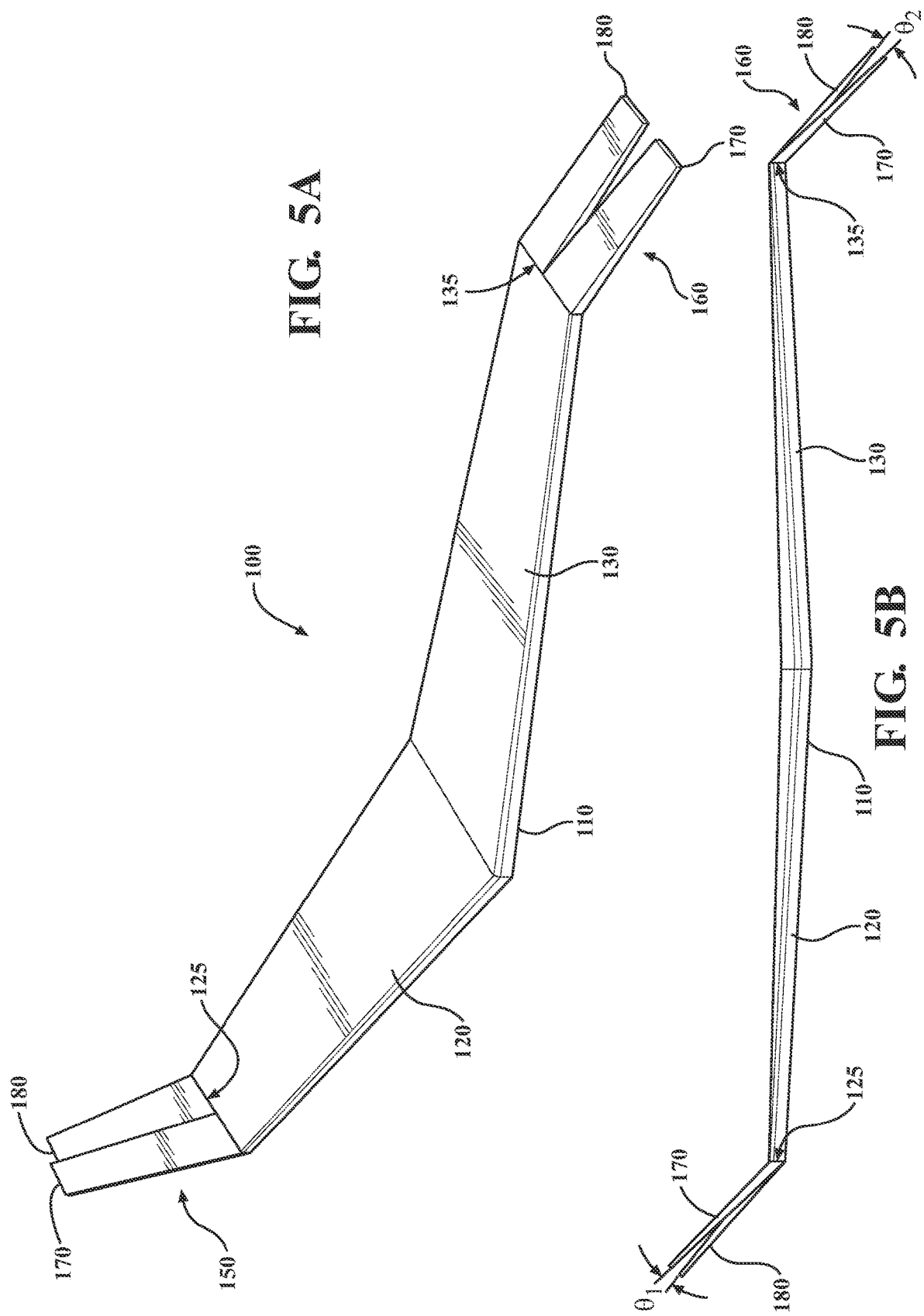

US 11,520,355 B2

WING TIP CONTROL EFFECTOR

FIELD

The subject matter described herein relates in general to aircraft and, more particularly, to the control of aircraft.

BACKGROUND

Aircraft can be exposed to highly variable environments. As a result, the aircraft may be subjected to changing aerodynamic requirements. Some aircraft have wings that can change shape and configuration to meet these changing requirements.

SUMMARY

In one respect, the present disclosure is directed to an aircraft. The aircraft includes an aircraft body including a wing. The wing can extend laterally from the aircraft body to a tip. The aircraft can include an end effector that includes a fore winglet and an aft winglet. The fore winglet and the aft winglet can be pivotably connected to the tip. The fore winglet and the aft winglet can be independently operable.

In another respect, the present disclosure is directed to a system. The system includes an aircraft. The aircraft includes an aircraft body that includes a first wing and a second wing. The first wing can extend laterally from the aircraft body to a first tip, and the second wing can extend laterally from the aircraft body to a second tip. The aircraft can include a first end effector. The first end effector can include a fore winglet and an aft winglet. The fore winglet and the aft winglet can be pivotably connected to the first tip. The fore winglet and the aft winglet can be independently operable. The aircraft can include a second end effector. The second end effector can include a fore winglet and an aft winglet. The fore winglet and the aft winglet can be pivotably connected to the second tip. The fore winglet and the aft winglet can be independently operable. The first end effector and the second end effector can be independently operable. The system can include a processor. The processor can be operatively connected to control movement of the fore winglet and the aft winglet of the first end effector and the second end effector.

BRIEF DESCRIPTION OF THE DRAWINGS

FIG. 3A is a view of a roll mode of the aircraft.
FIG. 3B is a view of the roll mode of the aircraft.
FIG. 4A is a view of a yaw mode of the aircraft.
FIG. 4B is a view of the yaw mode of the aircraft.
FIG. 5A is a view of a roll-yaw hybrid mode of the aircraft.
FIG. 5B is a view of the roll-yaw hybrid mode of the aircraft.

DETAILED DESCRIPTION

Figure 1:
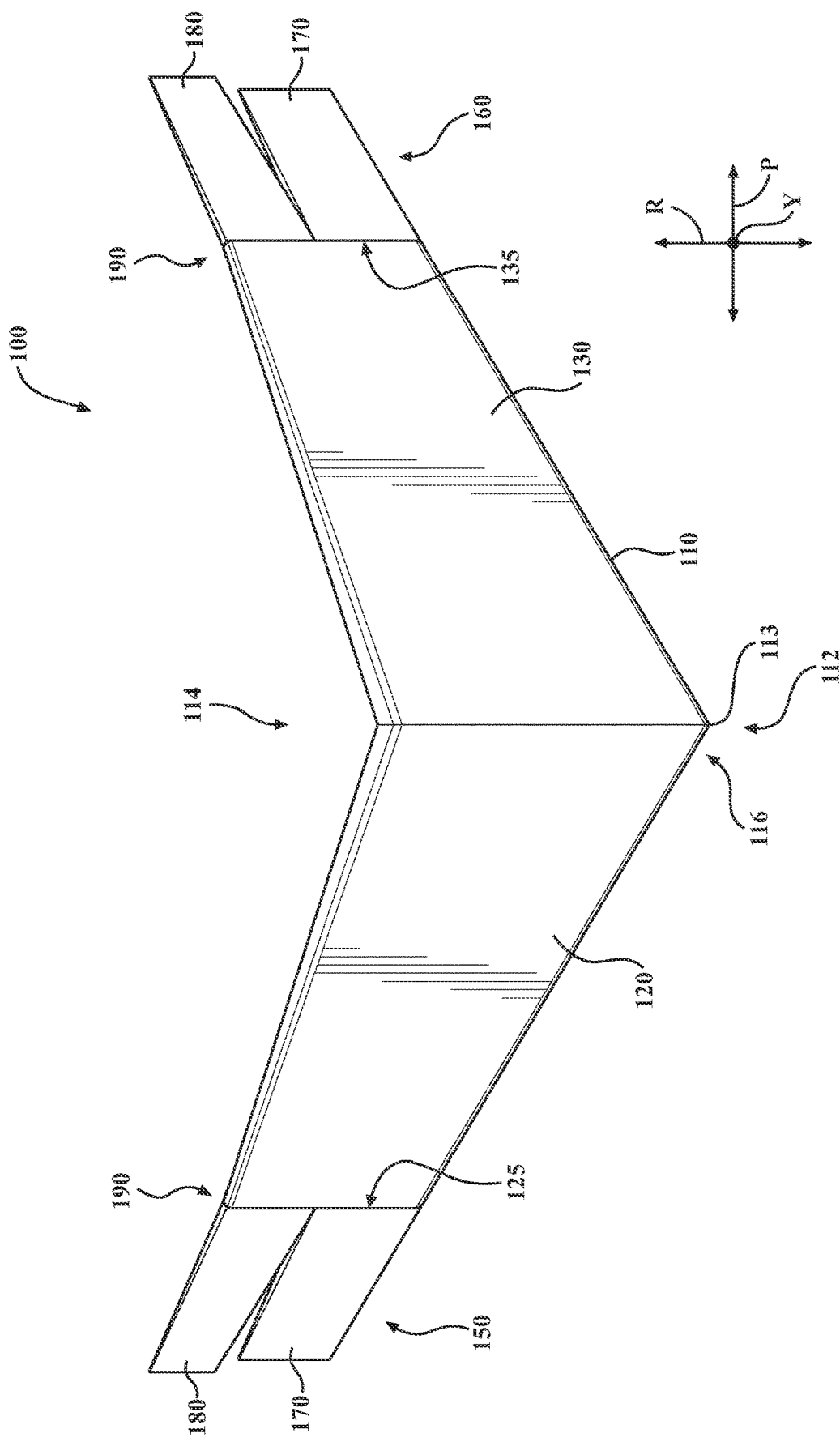
FIG. 1 is an example of an aircraft.

Due to the dynamic environments in which aircraft operate, greater control authority over the aircraft can allow for enhanced control and improved operation of the aircraft. According to arrangements described herein, the wings of an aircraft can include an end effector operatively connected to the wing tip. The end effector can include a plurality of winglets pivotably connected to a wing tip. The plurality of winglets can be independently operable from each other. The winglets can be deflected symmetrically as well as anti-symmetrically. Likewise, the end effectors can be independently operable from each other. The winglets and/or the end effectors can be operated in any combination to produce a desired effect on the aircraft. Such arrangements can allow for greater control and stability of the aircraft.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of an aircraft 100 is shown. The aircraft 100 can be any craft that is configured to fly or staying aloft in the air. In one or more arrangements, the aircraft 100 can be a kite. In one or more arrangements, the aircraft 100 can be a tailless aircraft. In one or more arrangements, the aircraft 100 can be a flying wing type aircraft.

The aircraft 100 can include a body 110. The body 110 can have any size, shape, and/or configuration. In the example shown, the body 110 can be generally V-shaped. The body 110 can be made of any suitable material, including, for example, fabric, metal, plastic, and/or wood. The aircraft 100 can have a front end 112 and a back end 114.

The aircraft 100 can have a yaw axis Y, a pitch axis P, and a roll axis R. The yaw axis Y extends into and out of the page in FIG. 1. A nose 113 of the aircraft 100 can rotate right or left about the yaw axis Y. The pitch axis P extends in a left-right direction on the page in FIG. 1. The pitch axis P can generally extend transversely from wing to wing. The nose 113 of the aircraft 100 can rotate up and down about the pitch axis P. The roll axis R extends in a top-bottom direction on the page in FIG. 1. The roll axis R can generally extend from the front end 112 to the back end 114 of the aircraft 100. The aircraft 100 can rotate about the roll axis R. The aircraft 100 can rotate about one or more of these axes.

The body 110 can be at least partially hollow. Thus, the body 110 can have one or more inner chambers. The inner chamber(s) can be substantially sealed to retain a fluid therein. The inner chamber(s) can be substantially fluid impermeable.

In one or more arrangements, the body 110 can be configured to be inflatable. Thus, the body 110 can include one or more ports or valves to allow air or other fluid to be delivered to and/or released from one or more inner chambers of the body 110. The inner chamber can be operatively connected to a fluid source. In some arrangements, the fluid source can be configured to maintain a constant fluid pressure in the inner chamber. In some implementations, the fluid source can include a pump. In some arrangements, the fluid source can include a gas canister capable of delivering a compressed gas.

The body 110 can include a first wing 120 and a second wing 130. The first wing 120 can extend substantially laterally from a central body region 116 to a first tip 125. The second wing 130 can extend substantially laterally from the central body region 116 to a second tip 135. While described herein as the first wing 120 and a second wing 130, it will be appreciated that the aircraft 100 can have or can be a single, continuous wing overall. In such case, the first wing 120 can be a first wing portion, and the second wing 130 can be a second wing portion.

The aircraft 100 can include a first end effector 150 and a second end effector 160. The first end effector 150 can be operatively connected to the first tip 125. The second end effector 160 can be operatively connected to the second tip 135. The first end effector 150 and the second end effector 160 can be substantially identical to each other. The first end effector 150 and the second end effector 160 can be substantially mirror images of each other. The first end effector 150 and the second end effector 160 can be independently operable from each other.

Each of the first end effector 150 and the second end effector 160 can include a plurality of winglets. For instance, each of the first end effector 150 and the second end effector 160 can include a fore winglet 170 and an aft winglet 180. The terms "fore" and "aft" are used to note the relative position of the respective winglet when the end effectors are installed in their intended operational position. The fore winglet 170 is located closer to the front end 112 of the aircraft 100 compared to the aft winglet 180. For convenience, the first end effector 150 and the second end effector 160 will be described herein as each having two winglets. However, it will be appreciated that arrangements herein are not limited to two winglets. Indeed, the first end effector 150 and/or the second end effector 160 can include more than two winglets.

The fore winglet 170 and the aft winglet 180 can have any suitable size, shape, and/or configuration. The fore winglet 170 can be different than the aft winglet 180. For instance, the fore winglet 170 and the aft winglet 180 can have different lengths, widths, and/or thickness. The fore winglet 170 and the aft winglet 180 can be made of any suitable material, including, for example, fabric, wood, metal, and/or plastic.

The fore winglet 170 and the aft winglet 180 can be pivotably connected to a respective one of the first tip 125 and the second tip 135. The pivotable connection can be achieved in any suitable manner. For instance, the pivotable connection can be achieved using one or more hinges 190. The fore winglet 170 and the aft winglet 180 can generally be pivoted upwardly and downwardly relative to the body 110 or respective one of the first tip 125 and the second tip 135.

The first end effector 150 and the second end effector 160 can be independently operable from each other. Further, the fore winglet 170 and the aft winglet 180 of the first end effector 150 can be independently operable from each other. Still further, the fore winglet 170 and the aft winglet 180 of the second end effector 160 can be independently operable from each other.

Figure 6:
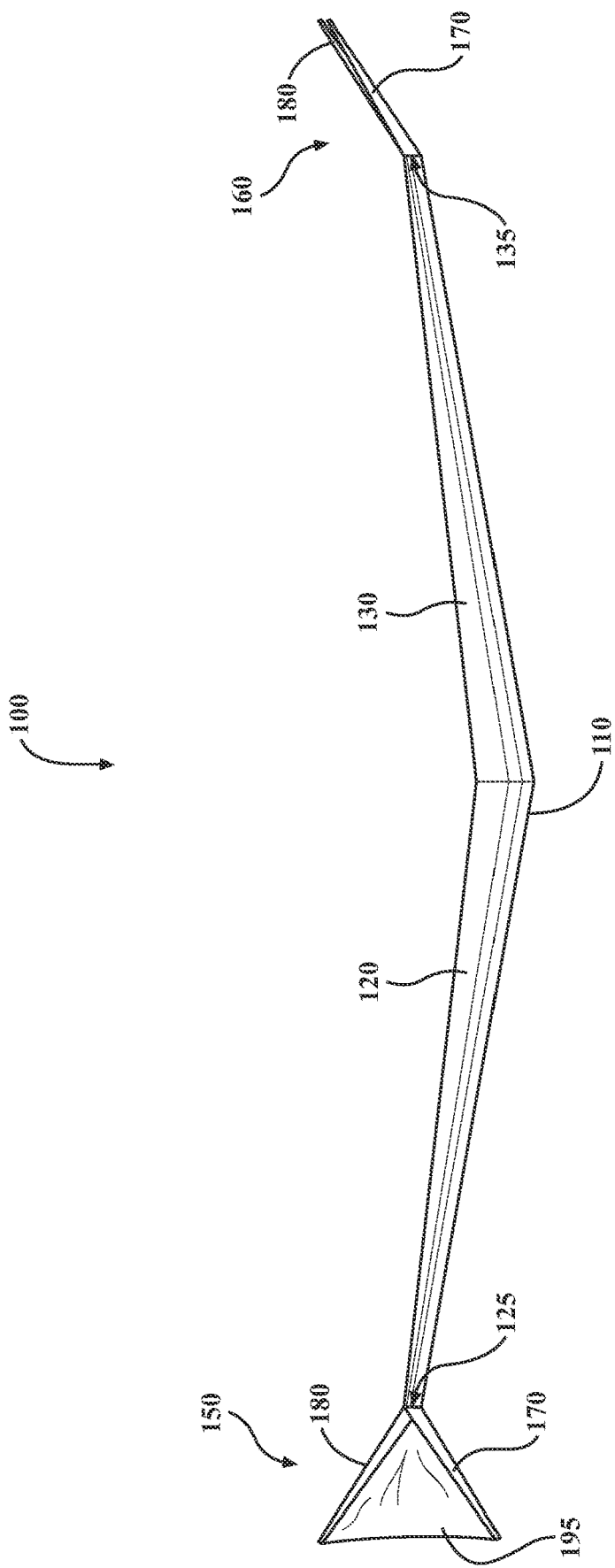
FIG. 6 is a view of the aircraft, showing a webbing connecting a fore winglet and an aft winglet.

In some arrangements, the fore winglet 170 and the aft winglet 180 are not connected to each other. In some arrangements, the fore winglet 170 and the aft winglet 180 can be connected by a connecting element. For instance, FIG. 6 shows an example of the fore winglet 170 and the aft winglet 180 being connected by a webbing 195. The webbing 195 can be made of any suitable material, such as, for example, fabric or plastic. The webbing 195 can be operatively connected to the fore winglet 170 and the aft winglet 180 in any suitable manner, including, for example, by one or more fasteners, one or more adhesives, one or more forms of mechanical engagement, and any combination thereof. While FIG. 6 shows the webbing 195 being used in connection with the first end effector 150, it will be appreciated that, alternatively or additionally, the webbing 195 can be used in connection with the second end effector 160.

Figure 2:
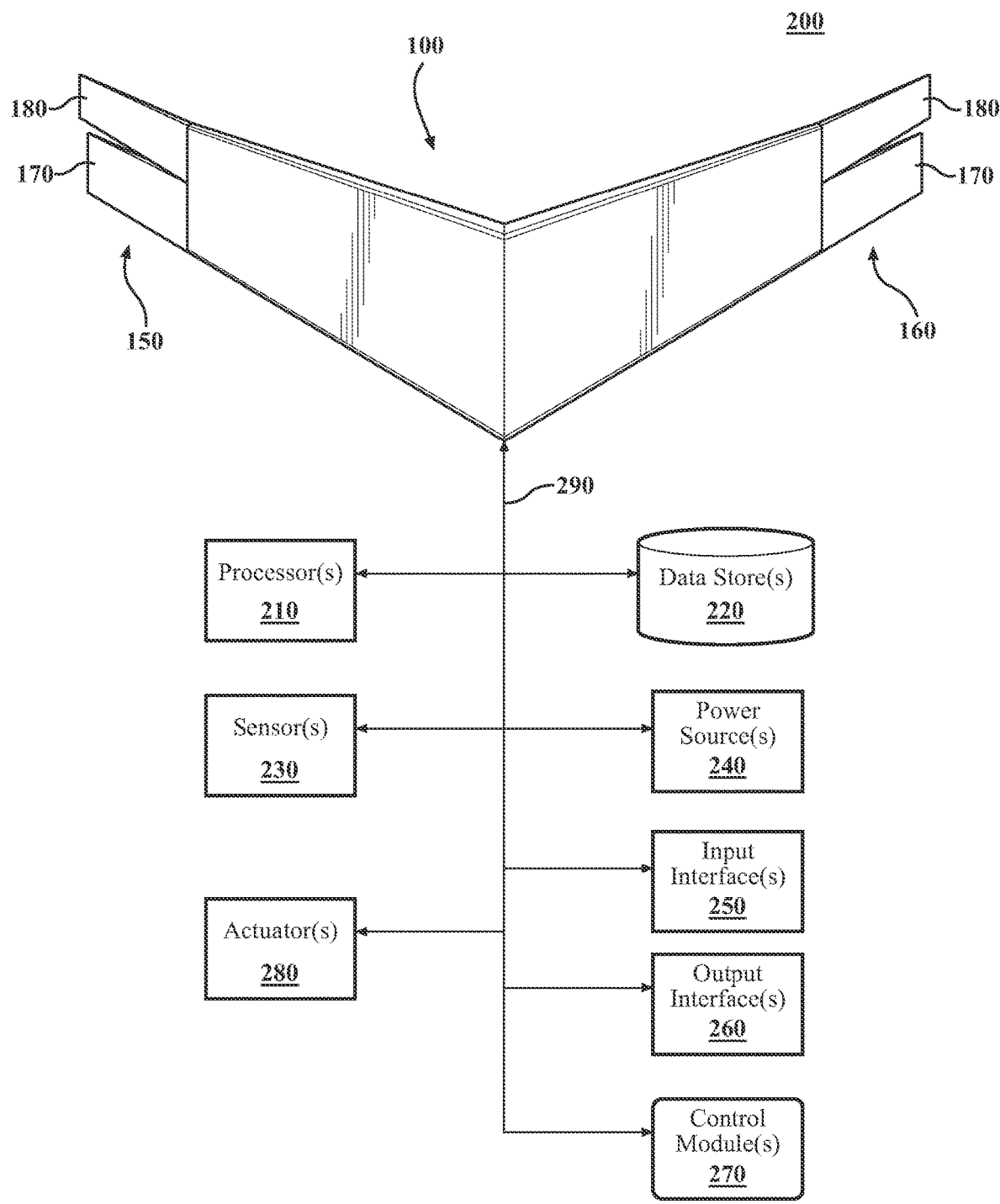
FIG. 2 is an example of a system.

Referring to FIG. 2, an example of a system 200. The system 200 can include various elements. Some of the possible elements of the system 200 are shown in FIG. 2 and will now be described. It will be understood that it is not necessary for the system 200 to have all of the elements shown in FIG. 2 or described herein. The system 200 can have any combination of the various elements shown in FIG. 2. Further, the system 200 can have additional elements to those shown in FIG. 2. In some arrangements, the system 200 may not include one or more of the elements shown in FIG. 2. Further, while the various elements may be shown as being located on or within the system 200 in FIG. 2, it will be understood that one or more of these elements can be located external to the system 200. Thus, such elements are not located on, within, or otherwise carried by the system 200. Further, the elements shown may be physically separated by large distances. Indeed, one or more of the elements can be located remote from the other elements of the system 200.

The system 200 can include the aircraft 100, one or more processors 210, one or more data stores 220, one or more sensors 230, one or more power sources 240, one or more input interfaces 250, one or more output interfaces 260, one or more control modules 270, and/or one or more actuators 280. Each of these elements will be described in turn below.

As noted above, the system 200 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other.

The system 200 can include one or more data stores 220 for storing one or more types of data. The data store(s) 220 can include volatile and/or non-volatile memory. Examples of suitable data stores 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 220 can be a component of the processor(s) 210, or the data store(s) 220 can be operatively connected to the processor(s) 210 for use thereby. The term "operatively connected," as used throughout this description, can include direct or indirect connections, including connections without direct physical contact.

The system 200 can include one or more sensors 230. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process. The sensor(s) 230 can be operatively connected to the processor(s) 210, the data store(s) 220, and/or other elements of the system 200 (including any of the elements shown in FIG. 1).

The sensor(s) 230 can include any suitable type of sensor. The sensor(s) 230 can be configured to acquire sensor data about the aircraft and/or about an external environment of the aircraft. Various examples of sensors will be described herein. However, it will be understood that the embodiments are not limited to the particular sensors described. One or more of the sensor(s) 230 can be located onboard the aircraft 100.

The sensor(s) 230 can include one or more aircraft sensors. The aircraft sensor(s) can be configured to acquire, detect, determine, assess, monitor, measure, quantify and/or sense aircraft data. "Aircraft data" includes and data or information about the aircraft 100 itself or any system, device, component or portion thereof. Aircraft data or information can include, for example, roll, yaw, pitch, position, orientation, speed, weight, temperature, pressure, stress, and/or strain, just to name a few possibilities. In one or more arrangements, the aircraft sensors can include an inertial measurement unit (IMU). Additional examples of aircraft sensors can include one or more speedometers, weight sensors, pressure sensors, position and/or displacement sensors, level sensors, force sensors, torque sensors, gyroscopes, accelerometers, a dead-reckoning system, a global navigation satellite system (GNSS), a global positioning system (GPS), radio compass (NDB), altitude sensors, attitude sensors, Angle-of-Attack (AoA) sensors, altimeters, and/or other suitable sensors. The aircraft sensors can be any type of sensor, now known or later developed.

The sensor(s) 230 can include one or more environment sensors. The environment sensor(s) can be configured to acquire, detect, determine, assess, monitor, measure, quantify, acquire, and/or sense environment data. "Environment data" includes and data or information about the external environment in which the aircraft 100 is located. For instance, the sensor(s) 230 can include one or more wind speed sensors and/or one or more wind angle sensors. In one or more arrangements, the environment sensor(s) can include one or more cameras, one or more radar sensors, one or more lidar sensors, one or more sonar sensors, and/or one or more ranging sensors. In one or more arrangements, the environment sensor(s) can include one or more temperature sensors, pressure sensors, proximity sensors, flow sensors, and/or others. In one or more arrangements, the environment sensor(s) can be configured to detect atmospheric phenomena that may affect the stability of the aircraft 100, such as turbulence, changes in barometric pressure, wind gusts, just to name a few possibilities. In one or more arrangements, the environment sensor(s) can be configured to detect objects in the external environment. In one or more arrangements, the environment sensor(s) can include one or more pitot tubes. The environment sensors can be any type of sensor, now known or later developed.

As noted above, the system 200 can include one or more power sources 240. The power source(s) 240 can be any power source capable of and/or configured to energize the first end effector 150, the second end effector 160, the fore winglet 170 and/or the aft winglet 180 of the first end effector 150 and/or the second end effector 160, and/or the actuator(s) 280. For example, the power source(s) 240 can include one or more batteries, one or more fuel cells, one or more generators, one or more alternators, one or more solar cells, and combinations thereof. The power source(s) 240 can be a source of electrical energy.

The system 200 can include one or more input interfaces 250. An "input interface" includes any device, component, system, element or arrangement or groups thereof that enable information/data to be entered into a machine. The input interface(s) 250 can receive an input from any source, such as a remote operator of the aircraft 100. Any suitable input interface 250 can be used, including, for example, a keypad, display, touch screen, multi-touch screen, button, joystick, mouse, trackball, microphone, gesture recognition (radar, lidar, camera, or ultrasound-based), and/or combinations thereof.

The system 200 can include one or more output interfaces 260. An "output interface" includes any device, component, system, element or arrangement or groups thereof that enable information/data to be presented to a user (e.g., a person) or other entity. The output interface(s) 260 can present information/data to a user or other entity. The output interface(s) 260 can include a display, an earphone, haptic device, and/or speaker. Some components of the system 200 may serve as both a component of the input interface(s) 250 and a component of the output interface(s) 260. In one or more arrangements, the input interface(s) 250 and/or the output interface(s) 260 can be provided remote from the aircraft 100, such as on a remote control device, unit, or system, which can be operated by a remote human operator.

The system 200 can include one or more modules. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data stores 220 may contain such instructions.

The system 200 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 200 can include one or more control modules 270. The control module(s) 270 can include profiles and logic for actively controlling the first end effector 150 and the second end effector 160 according to arrangements herein. The control module(s) 270 can be configured to, autonomously or in response to a remote command, cause the winglets to deflect in a suitable manner so that the aircraft 100 remains airborne, stable, and/or stays at a desired altitude.

The control module(s) 270 can be configured to determine when the first end effector 150 and/or the second end effector 160 should be activated or deactivated. The control module(s) 270 can be configured to do so in any suitable manner. For instance, the control module(s) 270 can be configured to analyze data or information acquired by the sensor(s) 230 (e.g., the aircraft sensors and/or the environment sensors). Alternatively or additionally, the control module(s) 270 can be configured to detect user inputs (e.g., commands) provided on the input interface(s) 250. The control module(s) 270 can retrieve raw data from the sensor(s) 230 and/or from the data store(s) 220. The control module(s) 270 can use profiles, parameters, or setting loaded into the control module(s) 270 and/or stored in the data store(s) 220. The control module(s) 270 can be configured to control the first end effector 150 and the second end effector 160 based on the sensor data. The control module(s) 270 can be configured to control movement of the fore winglet 170 and the aft winglet 180 of the first end effector 150 and the second end effector 160.

The control module(s) 270 can analyze the sensor data to determine an appropriate action for the first end effector 150 and/or the second end effector 160. For instance, the control module(s) 270 can detect forces (e.g., aerodynamic forces) affecting the aircraft 100. As an example, the control module(s) 270 can detect roll, yaw, and/or pitch moments acting upon the aircraft 100. The control module(s) 270 can be configured to determine appropriate changes to the first end effector 150 and/or the second end effector 160 to mitigate detected changes or conditions affecting the aircraft 100 and/or to stabilize the aircraft 100. Various examples of such changes or configurations will be described herein.

The control module(s) 270 can be configured to cause the first end effector 150 and/or the second end effector 160 to be activated or deactivated. As used herein, "cause" or "causing" means to make, force, compel, direct, command, instruct, and/or enable an event or action to occur or at least be in a state where such event or action may occur, either in a direct or indirect manner. For instance, the control module(s) 270 can selectively permit or prevent the flow of electrical energy from the power source(s) 240 to one or more actuators 280 associated with the first end effector 150 and the second end effector 160. The control module(s) 270 can be configured send control signals or commands over a communication network 290 to the actuator(s) 280, the first end effector 150, and/or the second end effector 160, or other element of the system 200.

The control module(s) 270 can be configured to cause the actuator(s) 280, the first end effector 150, and/or the second end effector 160 to be selectively activated or deactivated based on aircraft data and/or environment data. In some instances, the control module(s) 270 can be configured to cause the actuator(s) 280, the first end effector 150, and/or the second end effector 160 to be selectively activated or deactivated based on user inputs (e.g., commands or other inputs indicative of activating or deactivating the actuator(s) 280, the first end effector 150, and/or the second end effector 160). For instance, a user can provide an input on the input interface(s) 250. The input can be to activate or deactivate the actuator(s) 280, the first end effector 150, and/or the second end effector 160. The control module(s) 270 can be configured to cause the actuator(s) 280, the first end effector 150, and/or the second end effector 160 to be deactivated or activated in accordance with the user input.

In some instances, the control module(s) 270 can be configured to cause the actuator(s) 280, the first end effector 150, and/or the second end effector 160 to be selectively activated or deactivated based on a current operational state of the aircraft 100. For instance, when the aircraft is in the process of landing, taking off, or hovering. The operational state of the aircraft 100 may be determined based on sensor data and/or user inputs.

The control module(s) 270 can be configured to control the actuator(s) 280, the first end effector 150, and/or the second end effector 160. The control module(s) 270 can be configured to individually control each the actuator(s) 280, the first end effector 150, the second end effector 160, and/or the fore winglet 170 and the aft winglet 180 of the first end effector 150, and/or the fore winglet 170 and the aft winglet 180 of the second end effector 160. Thus, the control of the fore winglet 170 and the aft winglet 180 of the first end effector 150 can be independent of the control of the fore winglet 170 and the aft winglet 180 of the second end effector 160. Further, the control of the first end effector 150 can be independent of the control of the second end effector 160. Various example of such control will be described herein.

In some arrangements, the control module(s) 270 can be configured to autonomously control the actuator(s) 280, the first end effector 150, and/or the second end effector 160. Alternatively or additionally, the control module(s) 270 can be configured to control the actuator(s) 280, the first end effector 150, and/or the second end effector 160 in response to remote control inputs.

The system 200 can include one or more actuators 280. The actuator(s) 280 can be operatively connected to cause pivoting movement of the fore winglet 170 and the aft winglet 180 of each of the first end effector 150 and the second end effector 160. The actuator(s) 280 can be operatively connected to the fore winglet 170 and the aft winglet 180. In one or more arrangements, the actuator(s) 280 can include servo motors. The actuator(s) 280 can include pneumatic actuators, hydraulic pistons, relays, solenoids, and/or piezoelectric actuators, just to name a few possibilities. The actuator(s) 280 can include piston(s), push and/or pull bar(s) or rod(s), pulley(s), gear(s), gear track(s), and/or magnet(s), just to name a few possibilities. The actuator(s) 280 can include any combination of the above. The actuator(s) 280 can be selectively activated to cause the fore winglet 170 and the aft winglet 180 to be moved into and out of various positions. In one or more arrangements, the actuator(s) 280 can be activated responsive to receiving signals or other inputs from the control module(s) 270 and/or from a user (e.g., via a remote control).

In some arrangements, the actuator(s) 280 can be soft hinge actuators. In such case, the hinge(s) 190 and the actuator(s) 280 can be combined together. In this example, the soft hinge actuators can include springs to resist the movement of the fore winglet 170 and the aft winglet 180. The springs can be designed based on known or expected aircraft and/or flight conditions, such as aircraft speed, expected loads, etc. The soft hinge actuators can be passively actuated responsive to real-time conditions acting upon the aircraft 100, as opposed to being controlled by the processor(s) 210 and/or the control module(s) 270. The soft hinge actuators can facilitate load alleviation, as they can reduce the number of moving parts on the aircraft and can reduce aircraft load.

The various elements of the system 200 can be communicatively linked to one another or one or more other elements through one or more communication networks 290. As used herein, the term "communicatively linked" can include direct or indirect connections through a communication channel, bus, pathway or another component or system. A "communication network" means one or more components designed to transmit and/or receive information from one source to another. The data store(s) 220 and/or one or more other elements of the system 200 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The control module(s) 270 can be configured to determine various effects on the aircraft 100 based on sensor data. For instance, the control module(s) 270 can provide more degree of freedom for providing lateral-directional control authority for roll and yaw motion. The fore and aft winglets can be deflected symmetrically or anti-symmetrically depending upon the type of control authority appropriate at a given time. The control module(s) 270 can be configured to achieve coordinated maneuvers by using variety of control allocation schemes. Different configurations of the fore and aft winglet deflections can be employed to achieve a desired control allocation, especially to achieve lateral-directional control authority for roll and yaw motion. These modes can be selected as appropriate by the control module(s) 270 based on real-time conditions of the aircraft or the environment in which the aircraft is operating. Various examples of such modes are shown in FIGS. 3-6.

Referring to FIGS. 3A and 3B, an example of a roll mode of the aircraft 100 is shown. The processor(s) 210 and/or the control module(s) 270 can be configured to control the first end effector 150 and the second end effector 160 according to the roll mode. In the roll mode, the processor(s) 210 and/or the control module(s) 270 can be configured to control the first end effector 150 such that the fore winglet 170 and the aft winglet 180 are deflected substantially simultaneously in opposite directions. For instance, the fore winglet 170 can be pivoted upward and the aft winglet 180 can be pivoted downward. With respect to the winglets, the terms "upward" and "downward" can be relative to their respective tip, their respective wing, a substantially horizontal plane, or a non-activated or neutral position. There can be any suitable angle $\alpha_1$ between the fore winglet 170 and the aft winglet 180. In one or more arrangements, the angle $\alpha_1$ between the fore winglet 170 and the aft winglet 180 can be relatively large. For example, the angle $\alpha_1$ can be about 60 degrees, about 55 degrees, about 50 degrees, about 45 degrees, or about 40 degrees, just to name a few possibilities.

Further, in the roll mode, the processor(s) 210 and/or the control module(s) 270 can be configured to control the second end effector 160 such that the fore winglet 170 and the aft winglet 180 are both pivoted downward. The fore winglet 170 and the aft winglet 180 can be pivoted downward at substantially the same angle. Thus, the fore winglet 170 and the aft winglet 180 can be substantially in line with each other. However, in some arrangements, the fore winglet 170 and the aft winglet 180 can be slightly offset from each other at an angle $\alpha_2$. It will be appreciated that the roll mode can achieve roll dominant moments. Further, it will be appreciated that the arrangements shown in FIGS. 3A-3B for the first end effector 150 and the second end effector 160 can be reversed. As a result, a roll moment can be achieved in the opposite direction.

Referring to FIGS. 4A and 4B, an example of a yaw mode of the aircraft 100 is shown. The processor(s) 210 and/or the control module(s) 270 can be configured to control the first end effector 150 and the second end effector 160 according to the yaw mode. In the yaw mode, the processor(s) 210 and/or the control module(s) 270 can be configured to control the first end effector 150 and the second end effector 160 such that their respective winglets are deflected substantially simultaneously in opposite directions. For instance, the fore winglet 170 and the aft winglet 180 of the first end effector 150 can be pivoted upward. Further, the fore winglet 170 and the aft winglet 180 of the second end effector 160 can be pivoted downward.

In some arrangements, the fore winglet 170 and the aft winglet 180 of one of the first end effector 150 or the second end effector 160 can be pivoted at different angles such that they are offset from each other. For example, fore winglet 170 and the aft winglet 180 can be offset from each other at an angle β. The angle β can be relatively small. For example, the angle β can be about 10 degrees or less, about 9 degree or less, about 8 degrees or less, about 7 degrees or less, about 6 degrees or less, about 5 degrees or less, about 4 degrees or less, about 3 degrees or less, about 2 degrees or less or about 1 degree or less. The fore winglet 170 and the aft winglet 180 of the other one of the first end effector 150 or the second end effector 160 can be substantially in line with each other.

It will be appreciated that the substantially simultaneous deflection of the winglets of the first end effector 150 and the second end effector 160 can achieve both roll and yaw moments. Further, by having an offset between the fore winglet 170 and the aft winglet 180 on one side, can achieve yaw dominant moments. Still further, a higher yaw control moment can be achieved by including the webbing 195 between the fore winglet 170 and the aft winglet 180, as shown in FIG. 6.

Further, it will be appreciated that the arrangements shown in FIGS. 4A-4B for the first end effector 150 and the second end effector 160 can be reversed. As a result, a yaw dominant moment in the opposite direction can be achieved.

Referring to FIGS. 5A and 5B, an example of a roll-yaw hybrid mode of the aircraft 100 is shown. The processor(s) 210 and/or the control module(s) 270 can be configured to control the first end effector 150 and the second end effector 160 according to the roll-yaw hybrid mode. In the roll-yaw hybrid mode, the processor(s) 210 and/or the control module(s) 270 can be configured to control the first end effector 150 and the second end effector 160 such that their respective winglets are deflected substantially simultaneously in opposite directions. It will be appreciated that the roll-yaw hybrid mode can achieve both roll and yaw moments.

As an example, the fore winglet 170 and the aft winglet 180 of the first end effector 150 can be pivoted upward. The fore winglet 170 and the aft winglet 180 can be pivoted at different angles such that they are offset from each other at an angle $\theta_1$. The angle $\theta_1$ can be relatively small. For example, the angle $\theta_1$ can be about 10 degrees or less, about 9 degree or less, about 8 degrees or less, about 7 degrees or less, about 6 degrees or less, about 5 degrees or less, about 4 degrees or less, about 3 degrees or less, about 2 degrees or less or about 1 degree or less. In some arrangements, the fore winglet 170 can be pivoted a greater amount than the aft winglet 180.

Further, in the roll-yaw hybrid mode, the processor(s) 210 and/or the control module(s) 270 can be configured to control the second end effector 160 such that the fore winglet 170 and the aft winglet 180 are pivoted downward. The fore winglet 170 and the aft winglet 180 can be pivoted at different angles such that they are offset from each other at an angle $\theta_2$. The angle $\theta_2$ can be relatively small. For example, the angle $\theta_2$ can be about 10 degrees or less, about 9 degree or less, about 8 degrees or less, about 7 degrees or less, about 6 degrees or less, about 5 degrees or less, about 4 degrees or less, about 3 degrees or less, about 2 degrees or less or about 1 degree or less. In some arrangements, the fore winglet 170 can be pivoted a greater amount than the aft winglet 180.

The angle $\theta_1$ between the fore winglet 170 and the aft winglet 180 of the first end effector 150 can be substantially the same as the angle $\theta_2$ between the fore winglet 170 and the after winglet 180 of the second end effector 160. Alternatively, the angle $\theta_1$ between the fore winglet 170 and the aft winglet 180 of the first end effector 150 can be different from the angle $\theta_2$ between the fore winglet 170 and the after winglet 180 of the second end effector 160

Further, it will be appreciated that the arrangements shown in FIGS. 5A-5B for the first end effector 150 and the second end effector 160 can be reversed. As a result, the roll and yaw moments in the opposite direction can be achieved.

It will be appreciated that the above examples of control modes are not intended to be limiting. Indeed, there can be additional or alternative control modes to those described herein.

It will be appreciated that the sensor(s) 230 of the aircraft 100 can acquire sensor data about the aircraft 100 itself and/or the surrounding environment. The processor(s) 210 and/or the control module(s) 270 can analyze the acquired sensor data to assess the condition and/or performance of the aircraft 100 and/or the forces acting on the aircraft 100. Based on this assessment, the processor(s) 210 and/or the control module(s) 270 can select an appropriate control mode for the aircraft 100. Such selection can be performed autonomously. The processor(s) 210 and/or the control module(s) 270 can cause the first end effector 150 and/or the second end effector 160 to implement the selected control mode. For instance, the processor(s) 210 and/or the control module(s) 270 can send command to the actuator(s) 280, the first end effector 150, the fore winglet 170 and/or the aft winglet 180 of the first end effector 150, the second end effector 160, and/or the fore winglet 170 and/or the aft winglet 180 of the second end effector 160.

It will be appreciated that arrangements described herein can provide numerous benefits, including one or more of the benefits mentioned herein. For example, arrangements described herein can be used to achieve coordinated maneuvers for an aircraft using various control allocation schemes. Arrangements described herein can allow for different combinations of winglet deflections to be employed to achieve desired control allocation, especially to achieve lateral-direction control authority for roll and yaw motion. Arrangements described herein can enhance roll and/or yaw authority for an aircraft. Arrangements described herein can achieve load alleviation. Arrangements described herein can facilitate flutter suppression. Arrangements described herein can provide more degree of freedom for providing lateral-directional control authority for roll and yaw motion. Arrangements described herein can facilitate the symmetrical or anti-symmetrical deflection of the winglets depending on the type of control authority needed. Arrangements described herein can enable asymmetric deflection of the winglets to generate roll and yaw moments when performing lateral-directional motions. Arrangements described herein can use the winglets for reducing induced drag while flying.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about"

includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. An aircraft comprising:
   an aircraft body including a wing, the wing extending laterally from the aircraft body to a tip; and
   an end effector including a fore winglet and an aft winglet, the fore winglet and the aft winglet being pivotably connected to the tip, the fore winglet and the aft winglet being independently operable,
   the aircraft being a kite.

2. An aircraft comprising:
   an aircraft body including a wing, the wing extending laterally from the aircraft body to a tip; and
   an end effector including a fore winglet and an aft winglet, the fore winglet and the aft winglet being pivotably connected to the tip, the fore winglet and the aft winglet being independently operable,
   the aircraft being tailless.

3. The aircraft of claim 1, wherein the fore winglet is different from the aft winglet.

4. An aircraft comprising:
   an aircraft body including a wing, the wing extending laterally from the aircraft body to a tip;
   an end effector including a fore winglet and an aft winglet, the fore winglet and the aft winglet being pivotably connected to the tip, the fore winglet and the aft winglet being independently operable; and
   webbing, and the fore winglet and the aft winglet being connected by the webbing.

5. An aircraft comprising:
   an aircraft body including a wing, the wing extending laterally from the aircraft body to a tip, the aircraft body being inflatable; and
   an end effector including a fore winglet and an aft winglet, the fore winglet and the aft winglet being pivotably connected to the tip, the fore winglet and the aft winglet being independently operable.

6. The aircraft of claim 1, wherein the fore winglet and the aft winglet are connected to the tip by a hinge.

7. The aircraft of claim 1, further including one or more actuators, the one or more actuators being operatively connected to cause pivoting movement of the fore winglet and the aft winglet.

8. A system comprising:
   an aircraft including:
      an aircraft body including a first wing and a second wing, the first wing extending laterally from the aircraft body to a first tip, the second wing extending laterally from the aircraft body to a second tip; and
      a first end effector including a fore winglet and an aft winglet, the fore winglet and the aft winglet being pivotably connected to the first tip, the fore winglet and the aft winglet being independently operable;
      a second end effector including a fore winglet and an aft winglet, the fore winglet and the aft winglet are pivotably connected to the second tip, the fore winglet and the aft winglet being independently operable,
      the first end effector and the second end effector being independently operable; and
      webbing, and wherein the fore winglet and aft winglet of the first end effector and the second end effector are connected by the webbing; and
   a processor operatively connected to control movement of the fore winglet and the aft winglet of the first end effector and the second end effector.

9. The system of claim 8, further including one or more actuators operatively connected to the processor, the one or more actuators being operatively connected to cause pivoting movement of the fore winglet and the aft winglet of the first end effector and the second end effector.

10. The system of claim 8, wherein the processor is configured to control the first end effector and the second end effector in a roll mode, wherein, in the roll mode, the processor is configured to:
    control the first end effector such that the fore winglet is pivoted upward and the aft winglet is pivoted downward relative to the first tip; and
    control the second end effector such that the fore winglet and the aft winglet are pivoted downwardly relative to the second tip.

11. The system of claim 8, wherein the processor is configured to control the first end effector and the second end effector in a yaw mode, wherein, in the yaw mode, the processor is configured to:
    control the first end effector such that the fore winglet and the aft winglet are pivoted upward relative to the first tip; and
    control the second end effector such that the fore winglet and the aft winglet are pivoted downward relative to the second tip.

12. The system of claim 11, wherein the fore winglet and the aft winglet of one of the first end effector or the second end effector are offset from each other.

13. The system of claim 8, wherein the processor is configured to control the first end effector and the second end effector in a roll-yaw hybrid mode, wherein, in the roll-yaw hybrid mode, the processor is configured to:
    control the first end effector such that the fore winglet and the aft winglet are pivoted upward relative to the first tip, wherein the fore winglet and the aft winglet are offset; and
    control the second end effector such that the fore winglet and the aft winglet are pivoted downward relative to the second tip, wherein the fore winglet and the aft winglet are offset.

14. The system of claim 8, further including a sensor, wherein the sensor is located onboard the aircraft, wherein the sensor is operatively connected to the processor, and wherein the sensor is configured to acquire sensor data about one of: the aircraft and an external environment of the aircraft.

15. The system of claim 14, wherein the sensor is a wind speed sensor.

16. The system of claim 14, wherein the processor is configured to control the first end effector and the second end effector based on the sensor data.

17. The system of claim 8, wherein the processor is configured to control the first end effector and the second end effector autonomously.

18. The system of claim 8, wherein the processor is configured to control the first end effector and the second end effector in response to remote control inputs.

19. A system comprising:
an aircraft, the aircraft being tailless, the aircraft including:
  an aircraft body including a first wing and a second wing, the first wing extending laterally from the aircraft body to a first tip, the second wing extending laterally from the aircraft body to a second tip; and
  a first end effector including a fore winglet and an aft winglet, the fore winglet and the aft winglet being pivotably connected to the first tip, the fore winglet and the aft winglet being independently operable;
  a second end effector including a fore winglet and an aft winglet, the fore winglet and the aft winglet are pivotably connected to the second tip, the fore winglet and the aft winglet being independently operable, and
  the first end effector and the second end effector being independently operable; and
a processor operatively connected to control movement of the fore winglet and the aft winglet of the first end effector and the second end effector.

20. A system comprising:
an aircraft, the aircraft being a kite, the aircraft including:
  an aircraft body including a first wing and a second wing, the first wing extending laterally from the aircraft body to a first tip, the second wing extending laterally from the aircraft body to a second tip; and
  a first end effector including a fore winglet and an aft winglet, the fore winglet and the aft winglet being pivotably connected to the first tip, the fore winglet and the aft winglet being independently operable;
  a second end effector including a fore winglet and an aft winglet, the fore winglet and the aft winglet are pivotably connected to the second tip, the fore winglet and the aft winglet being independently operable, and
  the first end effector and the second end effector being independently operable; and
a processor operatively connected to control movement of the fore winglet and the aft winglet of the first end effector and the second end effector.

21. A system comprising:
an aircraft including:
  an aircraft body including a first wing and a second wing, the first wing extending laterally from the aircraft body to a first tip, the second wing extending laterally from the aircraft body to a second tip, the aircraft body being inflatable; and
  a first end effector including a fore winglet and an aft winglet, the fore winglet and the aft winglet being pivotably connected to the first tip, the fore winglet and the aft winglet being independently operable;
  a second end effector including a fore winglet and an aft winglet, the fore winglet and the aft winglet are pivotably connected to the second tip, the fore winglet and the aft winglet being independently operable, and
  the first end effector and the second end effector being independently operable; and
a processor operatively connected to control movement of the fore winglet and the aft winglet of the first end effector and the second end effector.

* * * * *